W. G. DRUMMOND.
GEAR SHIFT.
APPLICATION FILED MAY 19, 1919.
1,346,532.
Patented July 13, 1920.
2 SHEETS—SHEET 1.
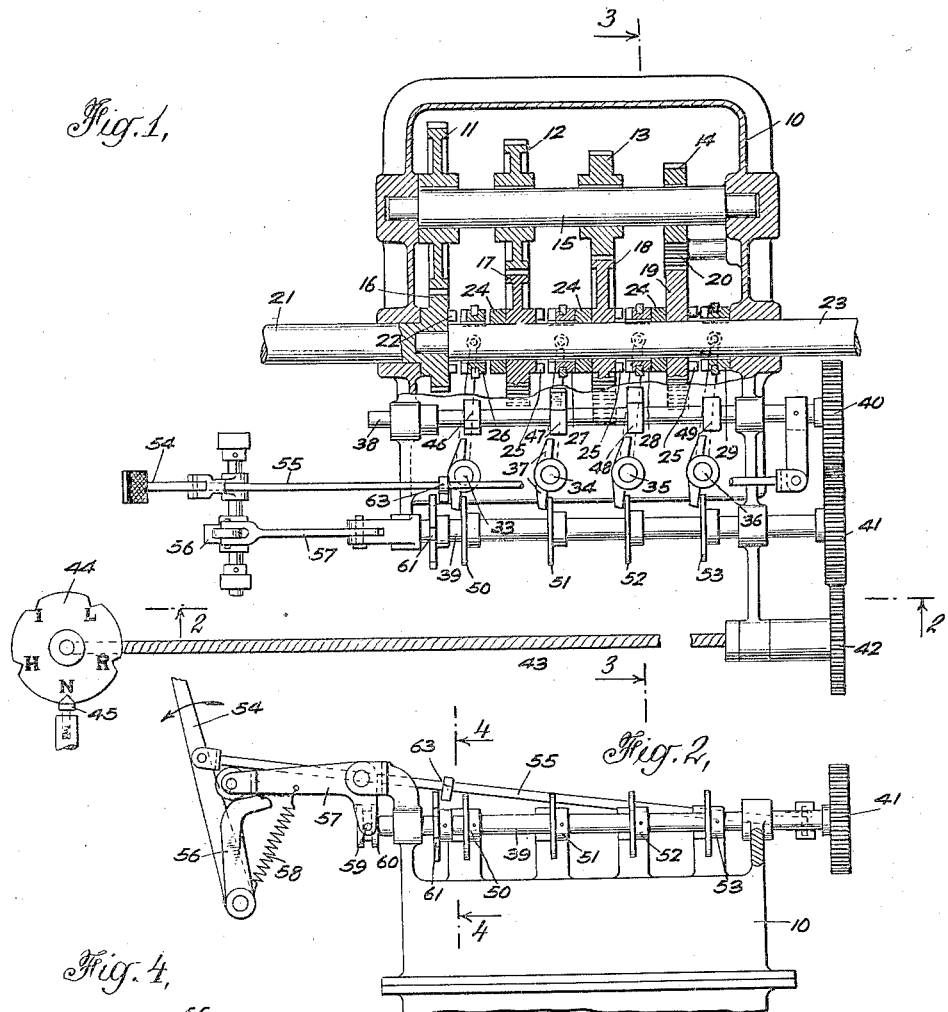
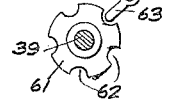
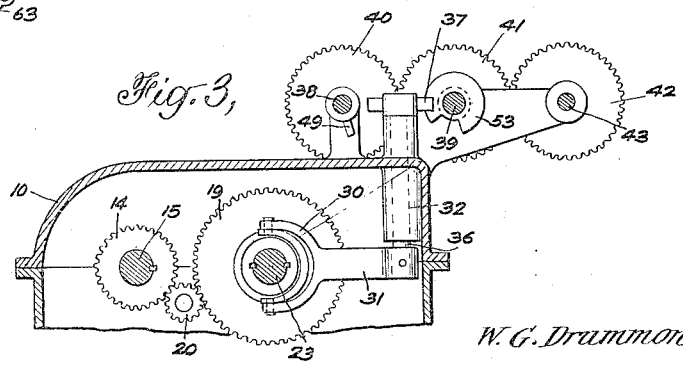
W. G. Drummond, INVENTOR.
BY
ATTORNEYS W. G. DRUMMOND.
GEAR SHIFT.
APPLICATION FILED MAY 19, 1919.
1,346,532.
Patented July 13, 1920.
2 SHEETS—SHEET 2.
Fig. 5. 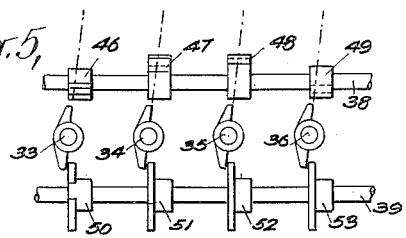 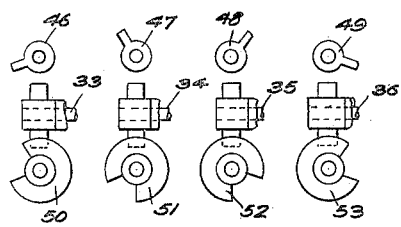
Fig. 6. 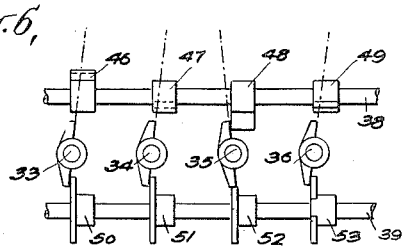 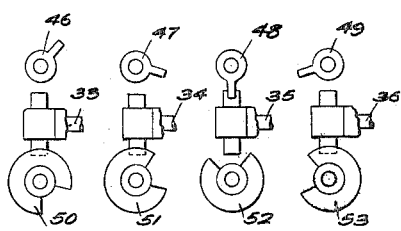
Fig. 7. 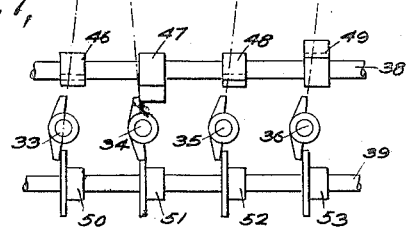 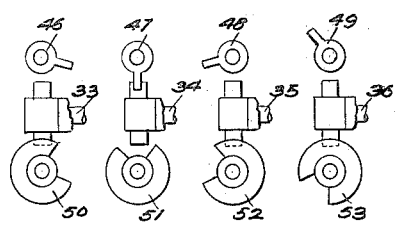
Fig. 8. 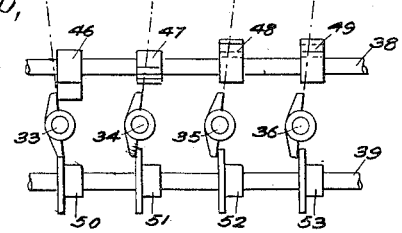 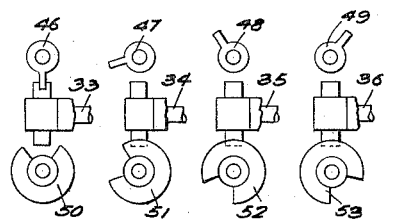
Fig. 9. 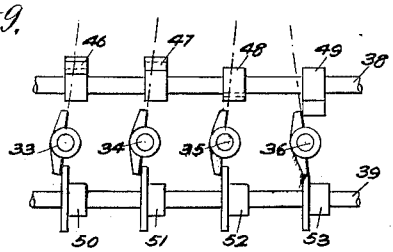 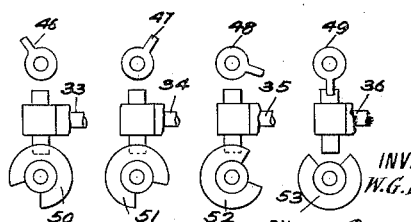
INVENTOR,
W. G. Drummond,
BY
ATTORNEYS

UNITED STATES PATENT OFFICE.

WILLIAM GEO. DRUMMOND, OF LOS ANGELES, CALIFORNIA.

GEAR-SHIFT.

1,346,532.

Specification of Letters Patent.    Patented July 13, 1920.

Application filed May 19, 1919. Serial No. 298,220.

*To all whom it may concern:*

Be it known that I, WILLIAM G. DRUMMOND, a citizen of the United States, and a resident of Los Angeles, in the county of Los Angeles and State of California, have invented certain new and useful Improvements in Gear-Shifts, of which the following is a specification.

My present invention relates generally to transmission devices for automobiles and motor cars, and particularly to gear shifting devices for use in connection with constant mesh gear sets, my object being the provision of an arrangement which will permit of manual selection of the gears to be engaged and automatic completion of the selected engagement when the clutch is disengaged, whereby to obviate the actual manual engagement of gears as now employed in mechanical gear shifts of the above type.

With this general object in mind my invention resides in its specific aspect in the gear shift which I will now describe with reference to the accompanying drawings, which form a part of this specification, and in which:

Figure 1 is a top plan view, partly broken away and in section.

Fig. 2 is a longitudinal section taken on line 2—2 of Fig. 1.

Fig. 3 is a transverse section taken on line 3—3 of Fig. 1.

Fig. 4 is a detail transverse section through the gear disconnecting shaft, taken on line 4—4 of Fig. 2, and Figs. 5 to 9 inclusive are diagrams illustrating different positions of the gear connecting and disconnecting means as hereinafter described.

Referring now to Figs. 1 to 4 inclusive, I have shown a conventional gear case 10 in which the connecting gears 11, 12, 13 and 14 are keyed upon the countershaft 15 and respectively in constant mesh with gears 16, 17, 18 and 19, the last mentioned gear being in connection through an intermediate idler 20 to constitute the reverse gearing.

The gear 16 is at one end of the engine shaft 21 and is fixed thereto with a clutch face 22 opposite the adjacent end of the main drive shaft 23 on which each of the gears 17, 18 and 19 is rotatably mounted at one side of a collar 24, each of said gears having a clutch face 25 similar to the clutch face 22 of the gear 16.

The clutch faces 22 and 25 of the several gears 16, 17, 18 and 19 are respectively engageable by clutch rings 26, 27, 28 and 29 which are splined on the main drive shaft 23, and each engaged by a yoke 30 whose arm 31 is secured to one end of a vertical shaft extending through a tubular bearing 32 of the gear case 10. The opposite end of the shafts just mentioned which are indicated at 33, 34, 35 and 36 have diametrically outstanding detents 37 extending horizontally between and toward a pair of parallel, longitudinal shafts 38 and 39 which are respectively the gear engaging and disengaging shafts.

The shafts 38 and 39 are both longitudinally shiftable and rotatable and their rotation is made simultaneous and equal by gears 40 and 41 of similar size connecting the same at one end and also engaged by another similar sized gear 42 of the selecting shaft 43, preferably a flexible shaft leading to a point within convenient reach of the operator and there provided with a peripherally notched dial 44 engaged by a spring stop 45.

The gear engaging shaft 38 has a longitudinal series of engaging teeth 46, 47, 48 and 49 for the detents of shafts 33, 34, 35 and 36, and the disengaging shaft 39 has a series of notched disks 50, 51, 52 and 53 for the detents of said shafts 33, 34, 35 and 36, through the notches of which the detents may pass when the disks are turned to present their notches in alinement.

The shafts 38 and 39 are so related that when one of the disks of the latter has its notch opposite one of the detents 37, the corresponding tooth of the former will also be opposite the said detent, as will be observed by an inspection of the several diagrams of Figs. 5 to 9 inclusive. It should be noted that no two disks can have their notches alined with detents 37 at the same time, although they may be turned to such a position that none of the notches aline with detents and such position of the shafts, which is shown in the diagram, Fig. 5, constitutes the neutral position of the gear set.

The shafts 38 and 39 are shifted longitudinally from the clutch pedal 54, movement of which in the direction of the arrow in Fig. 2 serves to disengage the clutch (not shown). Connection of this clutch pedal with the shaft 38 is through a pull rod 55 and is thus direct. At the same time the clutch pedal has a wiper arm 56 connected to move therewith and in engagement with one end of a bell-crank 57 held in connection with the same by a spring 58.

The bell-crank 57 has a yoke 59 engaging a grooved collar 60 at one end of shaft 39, the said bell-crank being so proportioned that movement of shaft 39 is short as compared to that of shaft 38 when the clutch pedal is depressed, and is complete before complete movement of shaft 38.

Thus, if the dial plate 44 is turned to the position shown in Fig. 1, the shafts 38 and 39 will be rotated to the neutral position as shown in the diagram, Fig. 5, so that when the clutch pedal 54 is depressed each of the disks 50, 51, 52 and 53 will engage a detent and shift the several gear clutches to disengaged position.

If the dial is turned to present notch "L" to the stop 45, shafts 38 and 39 will be rotated until disk 52 has its notch alined with the corresponding detent and tooth 48 is also alined therewith, as seen in Fig. 6. Thus when clutch pedal 54 is depressed the detent of shaft 35 will pass through the notch of disk 52 and will be engaged by tooth 48 so as to shift gear clutch 28 into engagement with gear 18, completing the low gear set which will be placed in operation when the clutch pedal 54 is again released.

From the foregoing, the diagrams of Figs. 7, 8 and 9 respectively, showing the position of the parts for intermediate, high and reverse, will be plainly understood and it will be plainly understood that after selection by manual shifting of the dial 44, the actual operation of the gear shift follows automatically when the shaft clutch is pushed out or released by depressing the clutch pedal.

In order, however, to obviate danger of connecting two gears at the same time, as for instance by careless incomplete movement of the dial 44 from notch to notch, a shift locking disk 61, seen in the detail Fig. 4, is secured on shaft 39 as in Figs. 1 and 2, and is provided with a peripheral series of notches 62 corresponding to the notches of the dial 44. The pull rod 55 is also provided with a projecting pin 63 which is movable through the notches of the disk 61 but is arrested by the disk unless one of the disk notches is turned to aline with said pin. Thus as disk 61 is moved or rotated in accordance with rotation of the dial 44, movement of the pull rod 55 will be arrested any time the dial 44 is not in proper position for a shift of gears, so as to lock shaft 38 against completion of its stroke to throw a gear clutch in engaged position.

I claim:

1. In a device of the character described, the combination with a shaft clutch actuating member, and a constant mesh gear set including a series of gear clutches operating in connection with certain of the gears of said set, of a pair of shafts shiftable lengthwise by the said shaft clutch actuating member, means carried by one of said shafts to shift the several gear clutches in one direction, means carried by the other shaft to engage the clutch actuating member to shift the gear clutches in the opposite direction, and means for manually rotating said shafts to bring selected clutch actuating means into operative position.

2. In a device of the character described, the combination with a shaft clutch actuating member, and a constant mesh gear set including a series of gear clutches operating in connection with certain of the gears of said set, of a pair of parallel shafts having series of opposing gear clutch actuating members, the members of one shaft being in the form of notched disks and those of the other shaft being in the form of projecting teeth, gear selecting means for simultaneously rotating said shafts, and connections between the said shafts and the shaft clutch actuating member for shifting the former lengthwise when the latter is moved to disengage the shaft clutch.

3. In a device of the character described, the combination with a shaft clutch actuating member, and a constant mesh gear set including a series of gear clutches operating in connection with certain of the gears of said set, of a pair of longitudinally shiftable and rotatable shafts having means to shift the gear clutches in relatively opposite directions, upon their longitudinal movement, said means being movable into and out of active position by rotation of the shafts, gear selecting means for simultaneously rotating said shafts and connections between the said shafts and the shaft clutch actuating member for shifting the former lengthwise when the latter is moved to disengage the shaft clutch.

4. In a device of the character described the combination with a shaft clutch actuating member, and a constant mesh gear set including a series of gear clutches operating in connection with certain of the gears of said set, of a pair of shafts shiftable lengthwise by the said shaft clutch actuating member, means carried by one of said shafts to shift the several gear clutches in one direction, means carried by the other shaft to shift the gear clutches in the opposite direction, and means for manually rotating said shafts to bring selected clutch actuating means into operative position, said last named means including a rotatable dial having a geared connection with the said shafts.

5. In a device of the character described, the combination with a shaft clutch actuating member, and a constant mesh gear set including a series of gear clutches operating in connection with certain of the gears of said set, of a pair of shafts shiftable lengthwise by the said shaft clutch actuating member, means carried by one of said shafts to shift the several gear clutches in one direction, means carried by the other shaft to shift the gear clutches in the opposite direction, and means for manually rotating said shafts to bring selected clutch actuating means into operative position, said last named means including a rotatable dial having a number of effective positions, and means for locking the said shafts against operative lengthwise movement when said dial is out of effective position.

6. In a device of the character described, the combination with a shaft clutch actuating member, and a constant mesh gear set including a series of gear clutches operating in connection with certain of the gears of said set, of means for shifting said gear clutches into and out of active position and including two sets of members, rotatable and longitudinally shiftable as a series, gear selecting means for simultaneously rotating said members, connections between said sets of members and the shaft clutch actuating member for simultaneously shifting the former when the latter is actuated to release the shaft clutch, and a single means for locking said latter connections against effective movement while the gear selecting means are improperly adjusted.

7. In a device of the character described, the combination with a shaft clutch actuating member, and a constant mesh gear set including a series of gear clutches operating in connection with certain of the gears of said set, of means for shifting said gear clutches into and out of active position and including two sets of members, rotatable and longitudinally shiftable as a series, gear selecting means for simultaneously rotating said members, connections between said sets of members and the shaft clutch actuating member for simultaneously shifting the former when the latter is actuated to release the shaft clutch, and a single means for locking said latter connections against effective movement, said last named means being shiftable into and out of active position by the said gear selecting means.

8. In a device of the character described, the combination with a shaft clutch actuating member, and a constant mesh gear set including a series of gear clutches operating in connection with certain of the gears of said set, of a pair of longitudinally shiftable and rotatable shafts having means to shift the gear clutches in relatively opposite directions, upon their longitudinal movement, said means being movable into and out of active position by rotation of the shafts, gear selecting means for simultaneously rotating said shafts and connections between the said shafts and the shaft clutch actuating member for shifting the former lengthwise when the latter is moved to disengage the shaft clutch, one of said shafts having a notched stop member secured thereon, the notches of which corresponding to the effective positions of the gear selecting means, and a stop piece carried by the shifting connections for engagement with the stop member and movable through the notches thereof.

9. In a device of the character described, the combination with a shaft clutch actuating member, and a constant mesh gear set including a series of gear clutches operating in connection with certain of the gears of said set, of a pair of longitudinally shiftable and rotatable shafts having means to shift the gear clutches in relatively opposite directions, upon their longitudinal movement, said means being movable into and out of active position by rotation of the shafts, gear selecting means for simultaneously rotating said shafts and connections between the said shafts and the shaft clutch actuating member for shifting the former lengthwise when the latter is moved to disengage the shaft clutch, said connections including a stop piece, and a notched disk secured on one of said shafts in the path of movement of the stop piece, said disk having its notches disposed to correspond with the effective positions of said gear selecting means and movable into and out of registry with the stop piece, for the purpose described.

WILLIAM GEO. DRUMMOND.